(12) United States Patent
Hendry et al.

(10) Patent No.: US 11,477,488 B2
(45) Date of Patent: **\*Oct. 18, 2022**

(54) METHOD AND APPARATUS FOR ENCODING/DECODING IMAGES

(71) Applicant: LG ELECTRONICS INC., Seoul (KR)

(72) Inventors: Hendry Hendry, Seoul (KR); Yongjoon Jeon, Seoul (KR); Chulkeun Kim, Seoul (KR); Sangoh Jeong, Seoul (KR); Byeongmoon Jeon, Seoul (KR); Jungsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/189,582

(22) Filed: Mar. 2, 2021

(65) Prior Publication Data

US 2021/0185360 A1 Jun. 17, 2021

Related U.S. Application Data

(63) Continuation of application No. 16/785,114, filed on Feb. 7, 2020, now Pat. No. 10,972,757, which is a
(Continued)

(51) Int. Cl.
*H04N 19/70* (2014.01)
*H04N 19/44* (2014.01)
(Continued)

(52) U.S. Cl.
CPC .......... *H04N 19/70* (2014.11); *H04N 19/188* (2014.11); *H04N 19/31* (2014.11); *H04N 19/44* (2014.11);
(Continued)

(58) Field of Classification Search
CPC ...... H04N 19/70; H04N 19/188; H04N 19/31; H04N 19/44; H04N 19/46; H04N 19/50; H04N 21/2387; H04N 19/13; H04N 19/30
See application file for complete search history.

(56) References Cited

U.S. PATENT DOCUMENTS

2008/0117988 A1\* 5/2008 Toma ............... H04N 21/42646
375/E7.021
2010/0027964 A1 2/2010 Toma et al.
(Continued)

FOREIGN PATENT DOCUMENTS

KR 10-2005-0019864 A 3/2005
KR 10-2007-0016659 A 2/2007
(Continued)

OTHER PUBLICATIONS

JCTVC-K0159: Joint Collaborative Team on Video Coding (JCT-VC) of ITU-T SG 16 WP 3 and ISO/IEC JTC 1/SC 29/WG 11, 11th Meeting: Shanghai, CN, Oct. 10-19, 2012, "AHG 9: On referenced and non-referenced DLP and TFD NAL units," LG Electronics, (3 Pages).
(Continued)

*Primary Examiner* — Robert J Hance
(74) *Attorney, Agent, or Firm* — Dentons US LLP

(57) ABSTRACT

Disclosed are a method and apparatus for encoding/decoding images. The image-decoding method comprises the steps of: receiving a bit stream including information regarding an NAL unit type; and checking whether or not the NAL unit in the bit stream is a reference picture based on said information regarding an NAL unit type and decoding the NAL unit. The information regarding an NAL unit type indicates whether the NAL unit is a reference reading picture or not a reference reading picture.

17 Claims, 12 Drawing Sheets

Related U.S. Application Data continuation of application No. 16/056,087, filed on Aug. 6, 2018, now Pat. No. 10,602,189, which is a continuation of application No. 15/710,985, filed on Sep. 21, 2017, now Pat. No. 10,075,736, which is a continuation of application No. 14/427,815, filed as application No. PCT/KR2013/008303 on Sep. 13, 2013, now Pat. No. 9,794,594.

(60) Provisional application No. 61/700,335, filed on Sep. 13, 2012.

(51) Int. Cl.
    *H04N 19/46*     (2014.01)
    *H04N 19/31*     (2014.01)
    *H04N 19/169*    (2014.01)
    *H04N 19/50*     (2014.01)
    *H04N 21/2387*   (2011.01)

(52) U.S. Cl.
    CPC ............ *H04N 19/46* (2014.11); *H04N 19/50* (2014.11); *H04N 21/2387* (2013.01)

(56) References Cited

U.S. PATENT DOCUMENTS

| | | | | |
|---|---|---|---|---|
| 2013/0077687 A1* | 3/2013 | Wang | ................... | H04N 19/176 375/E7.243 |
| 2013/0107953 A1* | 5/2013 | Chen | ................... | H04N 19/177 375/E7.243 |
| 2013/0114705 A1* | 5/2013 | Chen | ...................... | H04N 19/70 375/240.12 |
| 2013/0272430 A1* | 10/2013 | Sullivan | ................. | H04N 19/65 375/240.26 |
| 2013/0272618 A1* | 10/2013 | Deshpande | .......... | H04N 19/159 382/232 |
| 2013/0272619 A1* | 10/2013 | Deshpande | .......... | H04N 19/463 382/232 |
| 2014/0003520 A1* | 1/2014 | Rodriguez | ............. | H04N 19/50 375/240.15 |

FOREIGN PATENT DOCUMENTS

| | | |
|---|---|---|
| KR | 10-2011-0106465 A | 9/2011 |
| WO | 2010-123198 A | 10/2010 |

OTHER PUBLICATIONS

JCTVC-J0549: Joint Collaboration Team on Video Coding of ITU-T SG 16 WP 3 and ISO/IEC JTC 1/SC 29/WG11, 10th Meeting: Stockholm, SE, Jul. 11-20, 2012, NAL unit types for non-reference pictures within the same temporal sub-layer, NTT Docomo, Inc. Ericsson (4 pages).

JCTVC-J1003:Joint Collaboration Team on Video Coding of ITU-T SG 16 WP 3 and ISO/IEC JTC 1/SC 29/WG11, 10th Meeting: Stockholm, SE, Jul. 11-20, 2012, High efficiency video coding (HEVC) text specification draft 8, Editor (260 pages).

\* cited by examiner

METHOD AND APPARATUS FOR ENCODING/DECODING IMAGES

This application is a continuation of U.S. patent application Ser. No. 16/785,114 filed Feb. 7, 2020, which is continuation of U.S. patent application Ser. No. 16/056,087, filed Aug. 6, 2018, now U.S. Pat. No. 0,602,189, which is a continuation of U.S. patent application Ser. No. 15/710,985, filed Sep. 21, 2017, now U.S. Pat. No. 10,075,736, which is a continuation of U.S. patent application Ser. No. 14/427,815, filed Mar. 12, 2015, now U.S. Pat. No. 9,794,594, which is a 35 USC § 371 National Stage entry of International Application No. PCT/KR2013/008303 filed on Sep. 13, 2013, which claims priority to U.S. Provisional Application No. 61/770,335, filed on Sep. 13, 2012, all of which are incorporated by reference in their entirety for all purposes as if fully set forth herein.

TECHNICAL FIELD

The present invention relates to a video compression technique, and more particularly, to a method and apparatus for decoding image information in a bitstream.

BACKGROUND ART

Recently, there is a growing demand on high-resolution, high-quality images in various application fields. With the increase in the resolution and quality of the image, an amount of information for the image is also increased.

The increase in the information amount results in the introduction of a device having various capabilities and a network having various environments. With the introduction of the device of the various capabilities and the network having the various environments, the same content can be used with a variety of quality.

More specifically, as a user equipment can support an image of a variety of quality and an implemented network environment is diversified, an image of normal quality is used in a certain environment, whereas an image of higher quality can be used in another environment.

For example, a consumer who purchases a video content in a portable terminal can watch the same video content with a larger screen and a higher resolution by using a large-screen display at home.

A broadcasting service with a high definition (HD) resolution has recently been provided, and thus many users are accustomed to high-definition, high-quality images. Further, in addition to HDTV, service providers and users are paying attention to ultra high definition (UHD) having a resolution four times higher than the HDTV.

Therefore, in order to provide an image service requested by a user in various environments according to quality in various manners, it is necessary to provide a scalability to image quality (e.g., image picture quality, image resolution, image size, video frame rate, etc.) on the basis of a high-efficient encoding/decoding method performed on large-capacity video. In addition, there is a need to discuss various image processing methods accompanied by such a scalability.

SUMMARY OF INVENTION

Technical Problem

The present invention provides an image encoding/decoding method capable of improving an encoding/decoding efficiency.

The present invention also provides a bitstream extracting method and apparatus capable of improving an encoding/decoding efficiency.

The present invention also provides a network abstraction layer (NAL) unit type capable of improving an encoding/decoding efficiency.

Technical Solution

According to an aspect of the present invention, there is provided an image decoding method including: receiving a bitstream including information on a network abstraction layer (NAL) unit type; and decoding an NAL unit by confirming whether the NAL unit in the bitstream is a reference picture on the basis of the information on the NAL unit type, wherein the information on the NAL unit type is information indicating whether the NAL unit is a referenced leading picture or a non-referenced leading picture.

According to another aspect of the present invention, there is provide an image decoding apparatus including an entropy decoder for receiving a bitstream including information on an NAL unit type and for performing entropy decoding on an NAL unit by confirming whether the NAL unit in the bitstream is a reference picture on the basis of the information on the NAL unit type, wherein the information on the NAL unit type is information indicating whether the NAL unit is a referenced leading picture or a non-referenced leading picture.

According to another aspect of the present invention, there is provided an image encoding method including: generating a residual signal for a current picture by performing an inter prediction based on the current picture; and transmitting a bitstream including an NAL unit generated based on the residual signal for the current picture and information on the NAL unit, wherein the information on the NAL unit includes information on an NAL unit type determined according to whether the NAL unit is a referenced leading picture or whether the NAL unit is a non-referenced leading picture.

According to another aspect of the present invention, there is provided an image encoding apparatus including: a predictor for generating a residual signal for a current picture by performing an inter prediction based on the current picture; and an entropy encoder for outputting a bitstream by performing entropy encoding on an NAL unit generated based on the residual signal for the current picture and information on the NAL unit, wherein the information on the NAL unit includes information on an NAL unit type determined according to whether the NAL unit is a referenced leading picture or whether the NAL unit is a non-referenced leading picture.

Advantageous Effects

Since a network abstraction layer (NAL) unit type is defined to provide whether an NAL unit is a reference picture referenced by a different picture or a non-reference picture not referenced by the different picture, the NAL unit can be effectively extracted from a bitstream. In addition, since whether the NAL unit is the non-reference picture is correctly derived, the NAL unit can be removed from the bitstream without having an effect on a decoding process.

MODE FOR INVENTION

Figure 1:
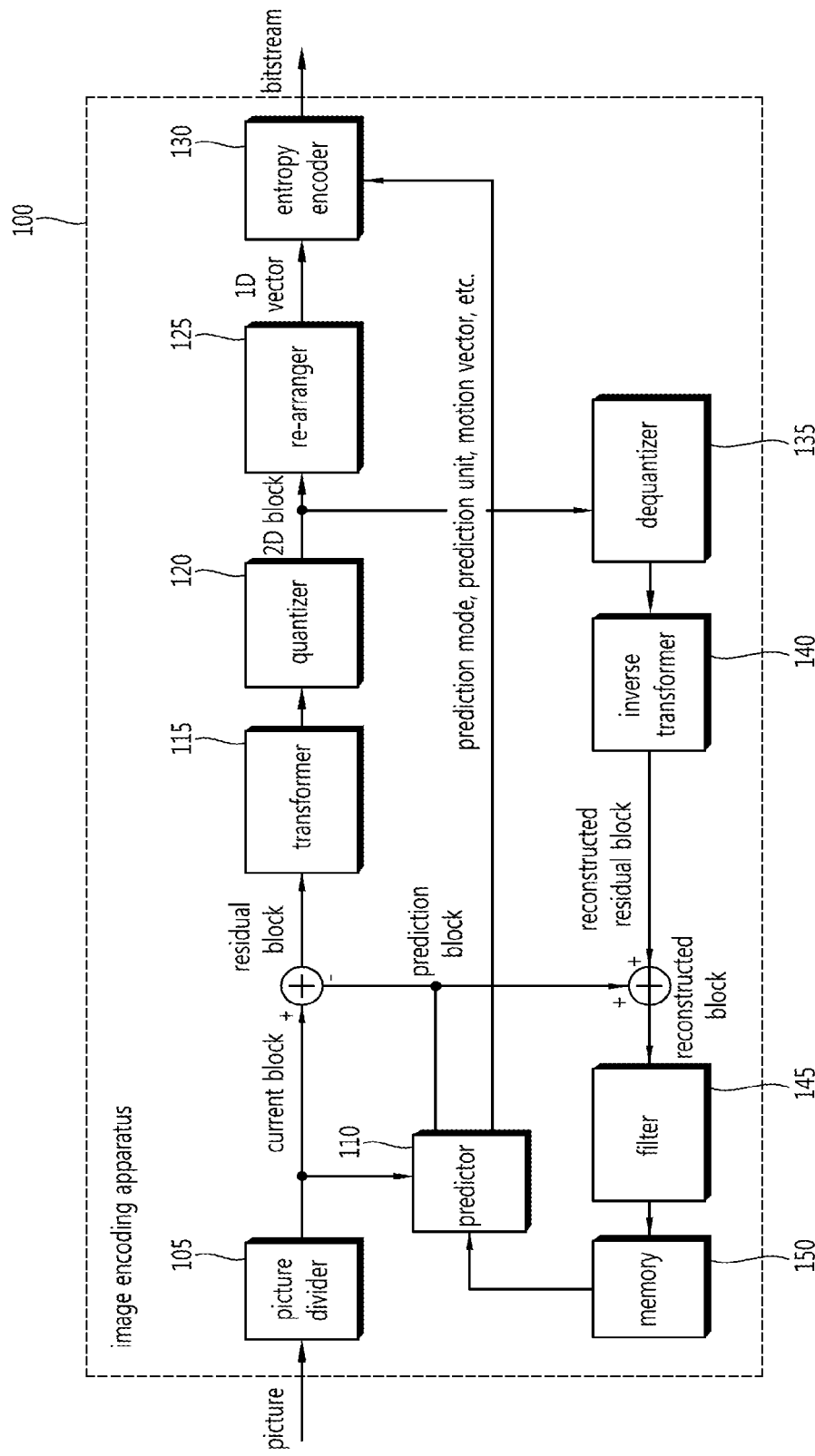
FIG. 1 is a block diagram of a video encoding apparatus according to an embodiment of the present invention.

Since the present invention may have various modifications and diverse embodiments, only specific embodiments are exemplarily illustrated in the drawings and will be described in detail. However, the present invention should not be construed as being limited to the specific embodiments set forth herein. The terminology used herein is for the purpose of describing particular embodiments only and is not intended to be limiting of the invention. As used herein, the singular forms are intended to include the plural forms as well, unless the context clearly indicates otherwise. In the present application, it is to be understood that the terms such as "including" or "having", etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Meanwhile, respective constructions in the drawings described in the present invention are illustrated independently for convenience of explanation regarding different particular functions in an image encoding apparatus/decoding apparatus, and it does not imply that the respective constructions are implemented with separate hardware entities or separate software entities. For example, among the respective constructions, two or more constructions may be combined into one construction, and one construction may be divided into a plurality of constructions. Embodiments in which the respective constructions are integrated and/or separated are also included in the scope of the present invention as long as not departing from the spirit of the invention.

Hereinafter, embodiments of the present invention will be described in detail with reference to the accompanying drawings. In addition, like reference numerals are used to indicate like elements throughout the drawings, and the same descriptions on the like elements will be omitted.

FIG. 1 is a block diagram of a video encoding apparatus according to an embodiment of the present invention. A video encoding/decoding method or apparatus may be implemented through an extension of a typical video encoding/decoding method which does not provide a scalability. The block diagram of FIG. 1 shows an embodiment of a video encoding apparatus which can be a basic scalable video encoding apparatus.

Referring to FIG. 1, an encoding apparatus 100 includes a picture divider 105, a predictor 110, a transformer 115, a quantizer 120, a re-arranger 125, an entropy encoder 130, a dequantizer 135, an inverse transformer 140, a filter 145, and a memory 150.

The picture divider 105 may divide an input picture on the basis of at least one processing unit. In this case, the processing unit may be a prediction unit (PU), a transform unit (TU), or a coding unit (CU).

Processing unit blocks which are divided in the picture divider 105 may have a quad-tree structure.

The predictor 110, as described below, includes an inter predictor which performs an inter prediction and an intra predictor which performs an intra prediction. The predictor 110 generates a prediction block by performing a prediction for a processing unit of a picture in the picture divider 105. The processing unit of the picture in the predictor 110 may be a CU, a TU, or a PU. In addition, the predictor 110 may determine whether a prediction performed for a corresponding processing unit is an inter prediction or an intra prediction, and may determine a specific content (e.g., a prediction mode, etc.) of each prediction method. In this case, the processing unit for performing a prediction may differ from the processing unit for determining the specific content. For example, a prediction method, a prediction mode, etc., may be determined in a unit of PU, and the prediction may be performed in a unit of TU.

The inter prediction may be used to generate a prediction block by performing a prediction on the basis of information of at least one picture between a previous picture and/or a next picture of a current picture. In addition, the intra prediction may be used to generate a prediction block by performing a prediction on the basis of pixel information in the current picture.

As a method of the inter prediction, a skip mode, a merge mode, a motion vector prediction (MVP), etc., may be used. In the inter prediction, regarding the PU, a reference picture may be selected and a reference block corresponding to the PU may be selected. The reference block may be selected in an integer pixel unit. Subsequently, a prediction block is generated such that a residual signal with respect to the current PU is minimized and a size of a motion vector is also minimized.

The prediction block may be generated in an integer sample unit, and may be generated in a pixel unit smaller than an integer unit, such as a ½ pixel unit or a ¼ pixel unit. In this case, the motion vector may also be expressed in a unit smaller than an integer pixel.

Information of an index of a reference picture selected through the inter prediction, a motion vector (e.g., motion vector predictor), a residual signal, etc., is subjected to entropy encoding and is then delivered to the decoding apparatus. When the skip mode is applied, since a prediction block can be a reconstructed block, a residual may not be generated, transformed, quantized, and transmitted.

When the intra prediction is performed, a prediction mode may be determined in a unit of PU, and thus a prediction may be performed in the unit of PU. In addition, the prediction mode may be determined in the unit of PU, and the intra prediction may be performed in a unit of TU.

In the intra prediction, the prediction mode may have 33 directional prediction modes and at least two non-directional modes. The non-directional mode may include a DC prediction mode and a planar mode.

In the intra prediction, a filter may be applied to a reference sample and thereafter a prediction block may be generated. In this case, whether to apply the filter to the reference sample may be determined according to an inter prediction mode and/or a size of a current block.

The PU may be a block having various sizes/shapes. For example, in case of the inter prediction, the PU may be a 2N×2N block, a 2N×N block, a N×2N block, a N×N block, or the like (where N is an integer). In case of the intra prediction, the PU may be a 2N×2N block, a N×N block, or the like (where N is an integer). In this case, it may be configured such that the PU having a size of the N×N block is applied only to a specific occasion. For example, it may be configured such that the PU having a size of the N×N block is used only for a minimum-sized CU or is used only for the intra prediction. In addition to the aforementioned sized PU, the PU may be further defined and used such as a N×mN block, a mN×N block, a 2N×mN block, or a mN×2N block (m<1).

A residual value (i.e., residual block or residual signal) between a generated prediction block and an original block is input to the transformer 115. In addition, prediction mode information used for the prediction, motion vector information, etc., may be coded in the entropy encoder 130 together with the residual value and may be delivered to a decoding apparatus.

The transformer 115 transforms the residual block in a unit of a transform block, and generates a transform coefficient.

The transform block is a rectangular block of samples, and is a block to which the same transformation is applied. The transform block may be a TU, and may have a quad tree structure.

The transformer 115 may perform a transformation according to a prediction mode and a block size which are applied to the residual block.

For example, if the intra prediction is applied to the residual block and the block is a 4×4 residual array, the residual block may be transformed by using discrete sine transform (DST), and otherwise, the residual block may be transformed by using discrete cosine transform (DCT).

The transformer 115 may perform a transformation to generate a transform block of transformation coefficients.

The quantizer 120 may generate a quantization coefficient by quantizing residual values, i.e., transformation coefficients, transformed in the transformer 115. A value calculated by the quantizer 120 may be provided to the dequantizer 135 and the re-arranger 125.

The re-arranger 125 re-arranges the quantized transformation coefficients provided from the quantizer 120. The re-arranging of the quantization coefficient may increase coding efficiency in the entropy encoder 130.

The re-arranger 125 may re-arrange quantization coefficients having a form of a 2-dimensional block into a format of a 1-dimensional vector by using a coefficient scanning method.

The entropy encoder 130 may perform entropy encoding with respect to the quantization coefficients re-arranged by the re-arranger 125. The entropy encoding may use Exponential Golomb, CAVLC(Context-Adaptive Variable Length Coding), and/or CABAC(Context-Adaptive Binary Arithmetic Coding). The entropy encoder 130 may encode a variety of information such as quantized transformation coefficient information and block type information of a CU delivered from the re-arranger 125 and the predictor 110, prediction mode information, division unit information, PU information and transmission unit information, motion vector information, reference picture information, interpolation information of a block, filtering information, etc.

In addition, the entropy encoder 130 may optionally add a specific change in a parameter set or syntax to be transmitted.

The dequantizer 135 dequantizes values quantized in the quantizer 120 (i.e., quantized transformation coefficients). The inverse transformer 140 may inverse-transform values dequantized in the dequantizer 135.

Residual values generated in the dequantizer 135 and the inverse transformer 140 may be combined with a prediction block predicted in the predictor 110, thereby generating a reconstructed block.

It is described in FIG. 1 that a residual block and a prediction block are added by using an adder to generate a reconstructed block. In this case, the adder may be regarded as an additional unit (i.e., a reconstructed block generator) for generating the reconstructed block.

The filter 145 may apply a de-blocking filter, an adaptive loop filter (ALF), and a sample adaptive offset (SAO) to a reconstructed picture.

The deblocking filter may remove block distortion which occurs at a boundary between blocks in the reconstructed picture. The ALF may perform filtering on the basis of a value used to compare an original image with an image reconstructed after filtering a block through the deblocking filter. The ALF may be performed only when high-efficiency is applied. Regarding a residual block to which the de-blocking filter is applied, the SAO reconstructs an offset difference with respect to an original image in a unit of pixel, and is applied in a form of a band offset, an edge offset, etc.

Meanwhile, regarding the reconstructed block used in the intra prediction, the filter 145 may not apply the filtering.

The memory 150 may store the reconstructed block or picture calculated by using the filter 145. The reconstructed block or picture stored in the memory 150 may be provided to the predictor 110 for performing the inter prediction.

Figure 2:
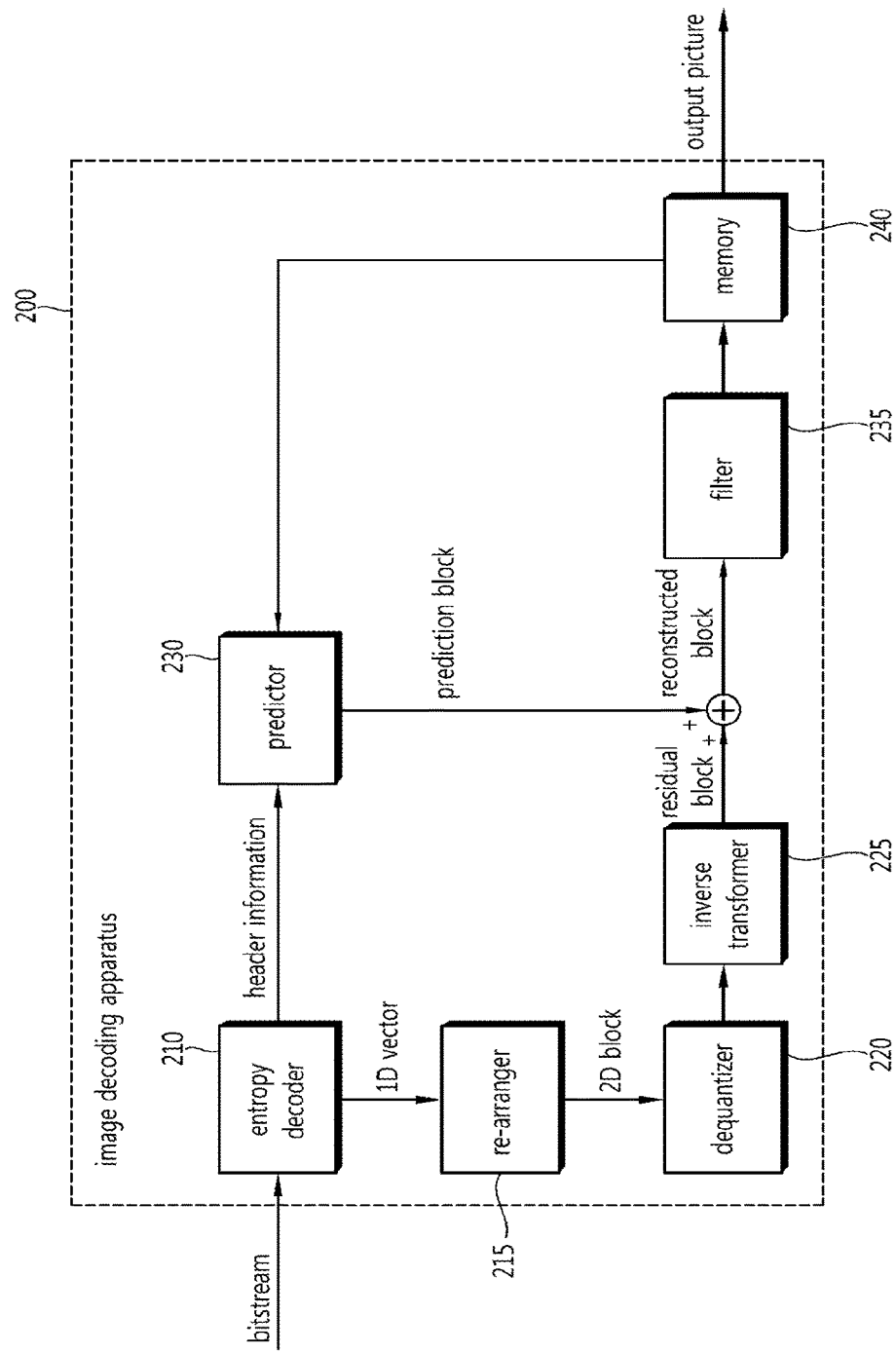
FIG. 2 is a block diagram of a video decoding apparatus according to an embodiment of the present invention.

FIG. 2 is a block diagram of a video decoding apparatus according to an embodiment of the present invention. As described in detail in FIG. 1, the video encoding/decoding method or apparatus may be implemented through an extension of a typical video encoding/decoding method which does not provide a scalability. The block diagram of FIG. 2 shows an embodiment of a video decoding apparatus which can be a basic scalable video decoding apparatus.

Referring to FIG. 2, a video decoding apparatus 200 includes an entropy decoder 210, a re-arranger 215, a dequantizer 220, an inverse transformer 225, a predictor 230, a filter 235, and a memory 240.

When an image bitstream is input in the video encoding apparatus, the input bitstream may be decoded according to a procedure by which image information is processed in the video encoding apparatus.

For example, when a variable length coding (VLC) is used to perform entropy encoding in the video encoding apparatus, the entropy decoder 210 may also be implemented with the same VLC table as that used in the encoding apparatus to perform entropy decoding. In addition, when CABAC is used to perform entropy encoding in the video encoding apparatus, the entropy decoder 210 may perform entropy decoding by using the CABAC in accordance therewith.

Among information decoded in the entropy decoder 210, information for generating a prediction block is provided to the predictor 230, and a residual value for which entropy decoding is performed in the entropy decoder 210, that is, a quantized transformation coefficient, may be input to the re-arranger 215.

The re-arranger 215 may re-arrange the bitstream subjected to the entropy decoding in the entropy decoder 210, i.e., the quantized transformation coefficients, according to a re-arranging method used in the encoding apparatus.

The re-arranger 215 may perform the re-arranging by reconstructing coefficients expressed in a 1-dimensional vector format into coefficients of a 2-dimensional block form. The re-arranger 215 may perform scanning on a coefficient on the basis of a prediction mode and a transformation block size which are applied to a current block (i.e., transformed block) to generate an array of coefficients (i.e., quantized transformation coefficients) having a format of a 2-dimensional block.

The dequantizer 220 may perform dequantization on the basis of a quantization parameter provided from the encoding apparatus and a coefficient value of a re-arranged block.

According to a result of quantization performed by the video encoding apparatus, the inverse transformer 225 may perform inverse DCT and/or inverse DST with respect to DCT and DST performed by the transformer of the encoding apparatus.

The inverse transformation may be performed on the basis of a transmission unit or image division unit determined in the encoding apparatus. The transformer of the encoding apparatus may selectively perform the DCT and/or the DST according to a plurality of pieces of information such as a prediction method, a current block size, and/or a prediction direction, etc. The inverse transformer 225 of the decoding apparatus may perform inverse transformation on the basis of information on transformation performed in the transformer of the encoding apparatus.

The predictor 230 may generate a prediction block on the basis of prediction block generation-related information provided from the entropy decoder 210 and previously decoded block and/or picture information provided from the memory 240.

If a prediction mode for a current PU is an intra prediction mode, an intra prediction for generating a prediction block may be performed on the basis of pixel information in a current picture.

If the prediction mode for the current PU is an inter prediction mode, an inter prediction may be performed on the current PU on the basis of information included in at least one picture between a previous picture and a next picture of the current picture. In this case, information regarding motion information required for the inter prediction of the current PU provided by the video encoding apparatus, e.g., information regarding a motion vector, a reference picture index, etc., may be used to confirm a skip flag, a merge flag, etc., received from the encoding apparatus and may be derived in accordance therewith.

A reconstructed block may be generated by using a prediction block generated from the predictor 230 and a residual block provided from the inverse transformer 225. It is described in FIG. 2 that a prediction block and a residual block are added by using an adder to generate a reconstructed block. In this case, the adder may be regarded as an additional unit (i.e., a reconstructed block generator) for generating the reconstructed block.

When the skip mode is applied, a residual is not transmitted, and a prediction block may be regarded as a reconstructed block.

The reconstructed block and/or picture may be provided to the filter 235. The filter 235 may apply a deblocking filter, a sample adaptive offset (SAO), and/or an adaptive loop filter (ALF), etc., to the reconstructed block and/or picture.

The memory 240 may store the reconstructed picture or block so as to be used as a reference picture or a reference block, or may provide the reconstructed picture to an output element.

Among the entropy decoder 210, re-arranger 215, dequantizer 220, inverse transformer 225, predictor 230, filter 235, and memory 240 included in the decoding apparatus 200, constitutional elements directly related to decoding of an image, for example, the entropy decoder 210, the re-arranger 215, the dequantizer 220, the inverse transformer 225, the predictor 230, the filter 235, etc., may be expressed as a decoder or a decoding unit by distinguishing from other constitutional elements.

In addition, the decoding apparatus 200 may further include a parser (not shown) for parsing information related to an encoded image included in the bitstream. The parser may include the entropy decoder 210, and may be included in the entropy decoder 210. The parser may be implemented with one constitutional element of the decoder.

Figure 3:
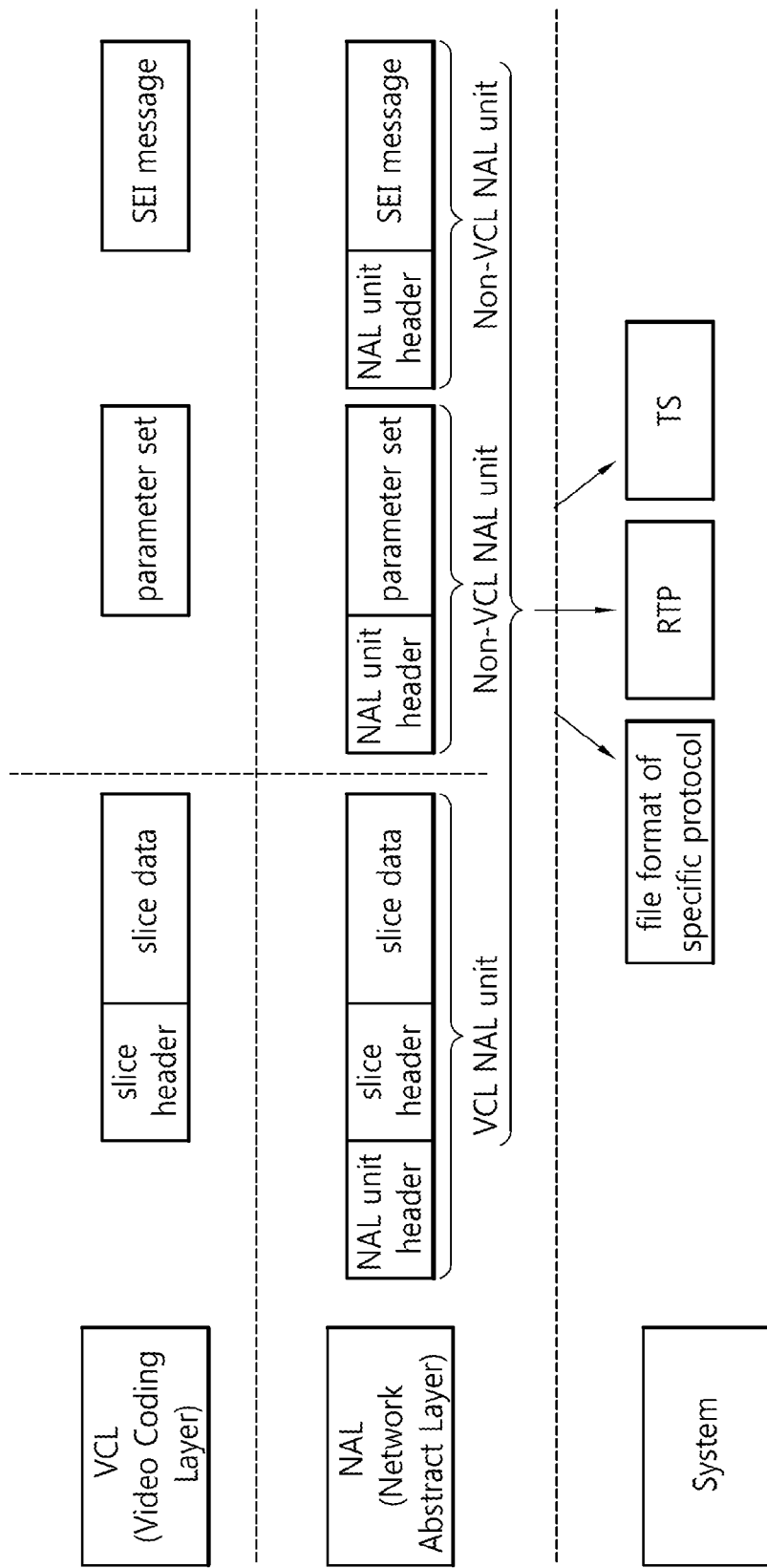
FIG. 3 shows a layered structure for a coded image processed in a decoding apparatus.

FIG. 3 shows a layered structure for a coded image processed in a decoding apparatus.

The coded image is divided into a video coding layer (VCL) for handling a process of image decoding or the process itself, a sub-ordinate system for transmitting and storing coded information, and a network abstraction layer (NAL) which exists between the VCL and the sub-ordinate system and which manages a network adaptation function.

In the VCL, VCL data including compressed image data (i.e., slice data) may be generated, or a parameter set including information such as a picture parameter set (PPS), a sequence parameter set (SPS), a video parameter set (VPS), etc., or a supplemental enhancement information (SEI) message additionally required for an image decoding process may be generated.

In the NAL, an NAL unit may be generated by appending header information (i.e., an NAL unit header) to a raw byte sequence payload (RBSP) generated in the VCL. In this case, the RBSP implies slice data, parameter set, SEI message, etc., generated in the VCL. The NAL unit header may include NAL unit type information specified according to the RBSP data included in the NAL unit.

As shown in FIG. 3, the NAL unit may be divided into a VCL NAL unit and a non-VCL NAL unit according to the RBSP generated in the VCL. The VCL NAL unit implies an NAL unit including image information (i.e., slice data). The non-VCL NAL unit implies an NAL unit including information required for image decoding (i.e., a parameter set or an SEI message).

The aforementioned VCL NAL unit and non-VCL NAL unit may be transmitted through a network by appending header information according to a data protocol of the sub-ordinate system. For example, the NAL unit may be transformed in a data format of a specific protocol such as H.264/AVC file format, RTP (Real-time Transport Protocol), TS (Transport Stream), etc., and thus may be transmitted through various networks.

As described above, regarding the NAL unit, an NAL unit type may be specified according to an RBSP data structure included in the NAL unit, and information regarding the NAL unit type stored in the NAL unit header may be signaled.

For example, according to whether the NAL unit includes image information (i.e., slice data), it may be roughly classified into a VCL NAL unit type and a non-VCL NAL unit. The VCL NAL unit type may be classified according to a property, type, etc., of a picture included in the VAL NAL unit, and the non-VCL NAL unit type may be classified according to a type, etc., of a parameter set.

The following is an example of an NAL unit type specified according to the property and type of the picture included in the VCL NAL unit.

TSA (Temporal Sub-layer Access): A type for an NAL unit including a coded slice segment of a TSA picture. Herein, the TSA picture is a picture which can be switched between temporal sub-layers in a bitstream supporting a temporal scalability, and is a picture indicating a position at which up-switching is possible from a lower sub-layer to an upper sub-layer.

STSA (Step-wise Temporal Sub-layer Access): A type for an NAL unit including a coded slice segment of an STSA picture. Herein, the STSA picture is a picture which can be switched between temporal sub-layers in the bitstream supporting the temporal scalability, and is a picture indicating a position at which up-switching is possible from a lower sub-layer to a higher sub-layer which is one level higher than the lower sub-layer.

TRAIL: A type for an NAL unit including a coded slice segment of a non-TSA, non-STSA trailing picture. Herein, the trailing picture implies a picture which appears after a picture capable of random access in terms of an output order and a decoding order.

IDR (Instantaneous Decoding Refresh): A type for an NAL unit including a coded slice segment of an IDR picture. Herein, the IDR picture is a picture capable of random access, and may be a first picture in a bitstream in terms of a decoding order or may appear in the middle of the bitstream. In addition, the IDR picture includes only I slices. Each IDR picture is a first picture of a coded video sequence (CVS) in terms of the decoding order. If the IDR picture has a relation with a decodable leading picture to be described below, an NAL unit type of the IDR picture may be denoted by IDR_W_RADL, and if the IDR picture does not have the relation with the leading picture, the NAL unit type of the IDR picture may be denoted by IDR_N_LP. The IDR picture does not have a relation with an undecodable leading picture to be described below.

CRA (Clean Random Access): A type of an NAL unit including a coded slice segment of a CRA picture. Herein, the CRA picture is a picture capable of random access, and may be a first picture in a bitstream in terms of a decoding order or may appear in the middle of the bitstream. In addition, the CRA picture includes only I slices. The CRA picture may have a relation with a leading picture which can be decoded or of which decoding can be skipped. The leading picture of which decoding can be skipped may not be output. The leading picture of which decoding can be skipped may use a picture not existing in the bitstream as a reference picture, and thus the leading picture of which decoding can be skipped by a decoder may not be output.

BLA (Broken Link Access): A type for an NAL unit including a coded slice segment of a BLA picture. Herein, the BLA picture is a picture capable of random access, and may be a first picture in a bitstream in terms of a decoding order or may appear in the middle of the bitstream. In addition, the BLA picture includes only I slices. In each BLA picture, a new coded video sequence (CVS) starts, and the same decoding process as that used for the IDR picture may be performed. If the BLA picture has a relation with a leading picture of which decoding can be skipped, an NAL unit type of the BLA picture may be denoted by BLA_W_LP, and if the BLA picture has a relation with a decodable leading picture, the NAL unit type of the BLA picture may be denoted by BLA_W_LP. If the BLA picture does not have a relation with the leading picture of which decoding can be skipped but has a relation with the decodable leading picture, the NAL unit type of the BLA picture may be denoted by BLA_W_RADL. When the BLA picture does not have a relation with the leading picture, the NAL unit type of the BLA picture may be denoted by BLA_N_LP.

The following is an example of an NAL unit type specified according to the property and type of the picture included in the non-VCL NAL unit.

VPS (Video Parameter Set): A type for an NAL unit including a VPS.

SPS (Sequence Parameter Set): A type for an NAL unit including an SPS.

PPS (Picture Parameter Set): A type for an NAL unit including a PPS.

The aforementioned NAL unit types have syntax information for the NAL unit type, and the syntax information stored in an NAL unit header may be signaled. For example, the syntax information may be nal_unit_type, and the NAL unit types may be specified by a value 'nal_unit_type'.

Meanwhile, a bitstream (or temporal scalable bitstream) supporting a temporal scalability includes information on a temporal layer which is scaled temporally. The information on the temporal layer may be identification information of a temporal layer specified according to a temporal scalability of the NAL unit. For example, the identification information of the temporal layer may use syntax information temporal_id, and the syntax information temporal_id may be stored in an NAL unit header in an encoding apparatus and may be signaled to a decoding apparatus. In the following description, the temporal layer may also be referred to as a sub-layer, a temporal sub-layer, a temporal scalable layer, etc.

Figure 4:
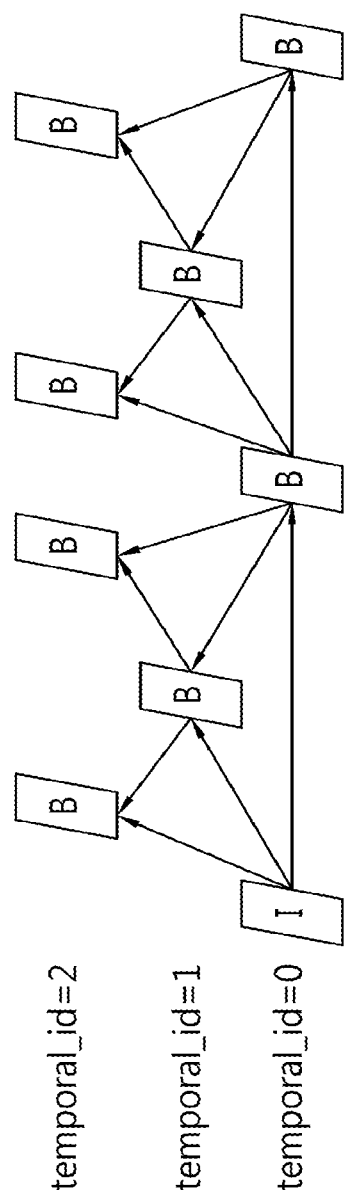
FIG. 4 shows a temporal layer structure for network abstraction layer (NAL) units in a bitstream supporting a temporal scalability.

FIG. 4 shows a temporal layer structure for NAL units in a bitstream supporting a temporal scalability.

If the bitstream supports the temporal scalability, NAL units included in the bitstream have identification information (e.g., temporal_id) of the temporal layer. For example, a temporal layer consisting of NAL units of which temporal_id is 0 may provide a lowest temporal scalability, and a temporal layer consisting of NAL units of which temporal_id is 2 may provide a highest temporal scalability.

In FIG. 4, a box indicated by I is an I picture, and a box indicated by B is a B picture. In addition, an arrow mark indicates a reference relation regarding whether one picture refers to another picture.

As shown in FIG. 4, the NAL units of a temporal layer of which temporal_id is 0 are reference pictures which can be referenced by NAL units of a temporal layer of which temporal_id is 0, 1, or 2. The NAL units of the temporal layer of which temporal_id is 1 are reference pictures which can be referenced by NAL units of a temporal layer of which temporal_id is 1 or 2. NAL units of a temporal layer of which temporal_id is 2 may be reference pictures which can be referenced by NAL units of the same temporal layer, i.e., the temporal layer of which temporal_id is 2, or may be non-reference pictures which are not referenced by a different picture.

As shown in FIG. 4, if NAL units of the temporal layer of which temporal_id is 2, that is, a highest temporal layer, are non-reference pictures, the NAL units may be extracted (or removed) from the bitstream without having an effect on different pictures.

In order to facilitate a bitstream extraction process, the present invention may provide information indicating whether the NAL unit is a reference picture or a non-reference picture. Such information may be provided with an NAL unit level.

An NAL unit type according to an embodiment of the present invention may be classified according to whether an NAL unit is a reference picture referenced by a different picture or a non-reference picture not referenced by the different picture.

For example, if a TSA picture is a reference picture, an NAL unit of the TSA picture may be denoted by TSA_R, and if the TSA picture is a non-reference picture, the NAL unit type of the TSA picture may be denoted by TSA_N. If an STSA picture is a reference picture, an NAL unit type of the STSA picture may be denoted by STSA_R, and if the STSA picture is a non-reference picture, the NAL unit type of the STSA picture may be denoted by STSA_N. If a non-TSA, non-STSA trailing picture is a reference picture, an NAL unit type of the non-TSA, non-STSA trailing picture may be denoted by TRAIL_R, and if the non-TSA, non-STSA trailing picture is a non-reference picture, the NAL unit type of the non-ISA, non-STSA trailing picture may be denoted by TRAIL_N.

Figure 5:
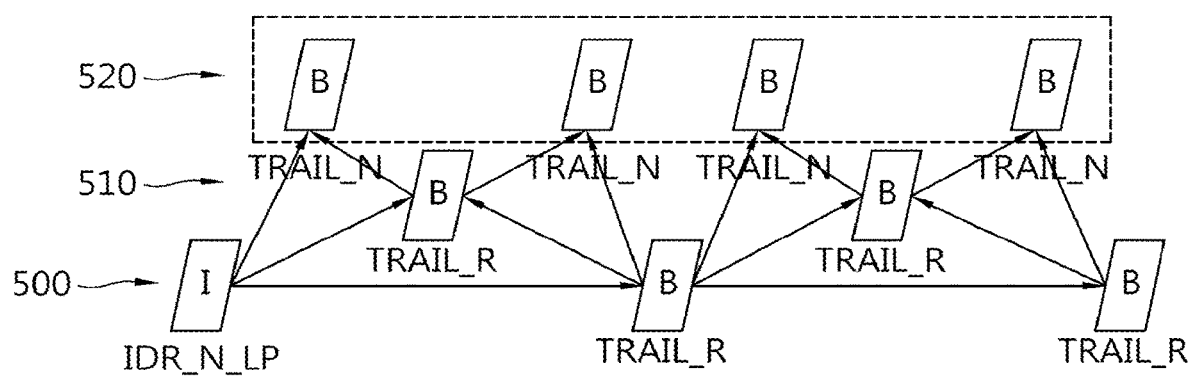
FIG. 5 shows a temporal layer structure for NAL units in a bitstream supporting a temporal scalability to which the present invention is applicable.

FIG. 5 shows a temporal layer structure for NAL units in a bitstream supporting a temporal scalability to which the present invention is applicable.

If the bitstream supports the temporal scalability, NAL units included in the bitstream have identification information (e.g., temporal_id) of the temporal layer.

For example, assuming a case where NAL units of which temporal_id is 0, 1, 2 are included in the bitstream, as shown in FIG. 5, it may be classified into a temporal layer 500 consisting of NAL units of which temporal_id is 0, a temporal layer 510 consisting of NAL units of which temporal_id is 1, and a temporal layer 520 consisting of NAL units of which temporal_id is 2. In this case, the temporal layer 500 consisting of NAL units of which temporal_id is 0 may provide a lowest temporal scalability, and the temporal layer 520 consisting of NAL units of which temporal_id is 2 may provide a highest temporal scalability.

In FIG. 5, a box indicated by I is an I picture, and a box indicated by B is a B picture. In addition, an arrow mark indicates a reference relation regarding whether one picture refers to another picture.

As shown in FIG. 5, the temporal layer 520 of which temporal_id is 2 consists of pictures of a TRAIL_N type. As described above, the TRAIL_N type is information indicating an NAL unit of which a trailing picture is a non-reference picture. The non-reference picture is not referenced by a different picture during an inter prediction, and thus can be removed from the bitstream without having an effect on a decoding process of different pictures when extracting the bitstream. Therefore, pictures of the TRAIL_ type of the temporal layer 520 of which temporal_id is 2 may not have an effect on the decoding even if the pictures are removed from the bitstream.

Meanwhile, among the aforementioned NAL unit types, IDR, CRA, and BLA types are information indicating an NAL unit including a picture capable of random access (or slicing), that is, a random access point (RAP) or intra random access point (IRAP) picture used as a random access point. In other words, the RAP picture may be an IDR, CRA, or BLA picture, and may include only an I slice. According to a decoding order in the bitstream, a first picture is an RAP picture.

If the RAP picture (i.e., IDR, CRA, or BLA picture) is included in the bitstream, there may be a picture of which an output order is earlier than that of the RAP picture whereas a decoding order is later than that of the RAP picture. Such pictures are called leading pictures (LPs).

Figure 6:
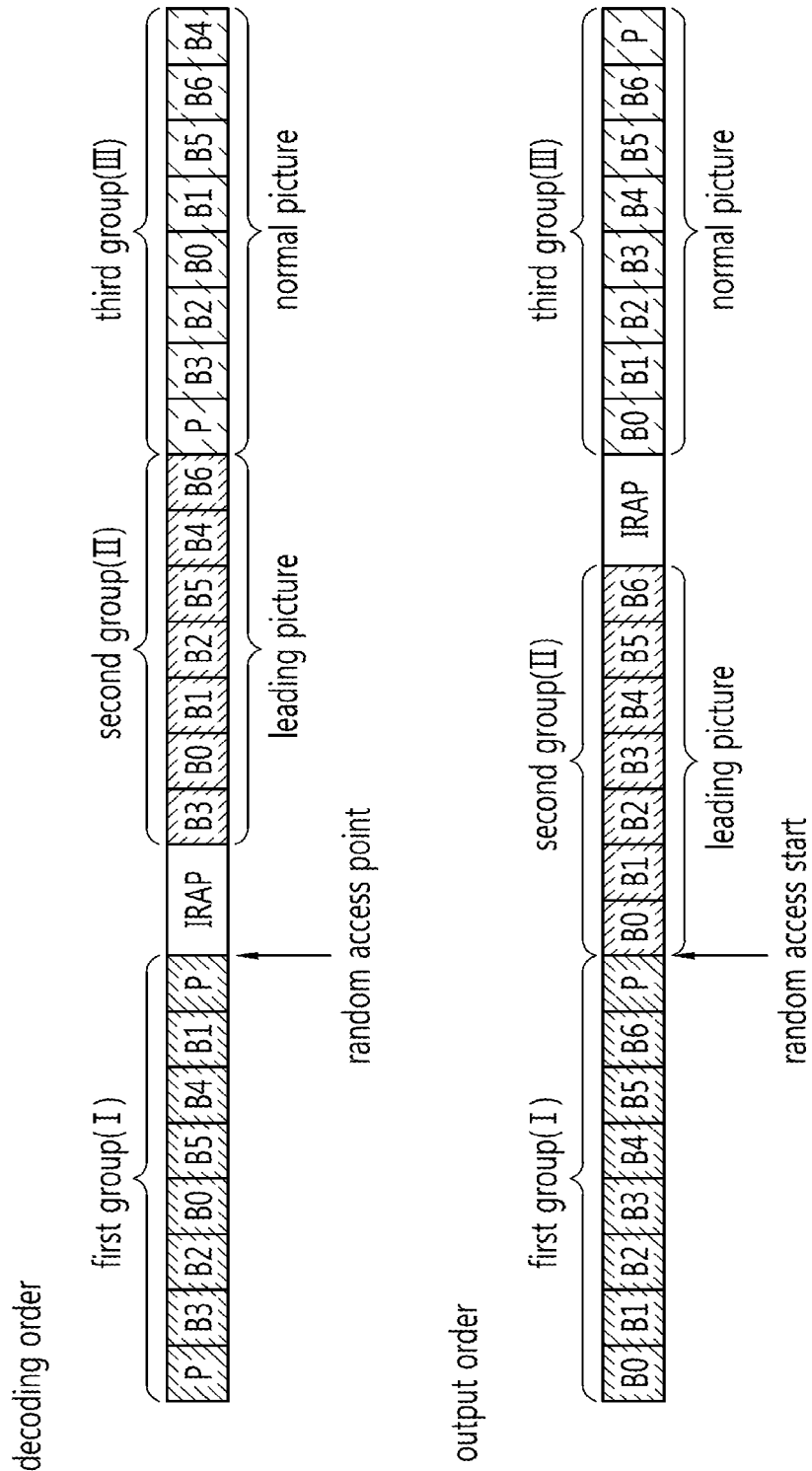
FIG. 6 is a diagram for explaining a randomly accessible picture.

FIG. 6 is a diagram for explaining a randomly accessible picture.

The randomly accessible picture, that is, an RAP or IRAP picture used as a random access point, is a first picture in a bitstream in terms of a decoding order, and includes only an I slice.

An output order (or display order) and decoding order of the picture are shown in FIG. 6. As shown, the output order and decoding order of the picture may differ from each other. For convenience of explanation, the pictures are divided by a specific group.

Pictures belonging to a first group I are pictures of which an output order and a decoding order are both earlier than those of IRAP pictures. Pictures belonging to a second group II are pictures of which an output order is earlier than that of the IRAP picture whereas a decoding order is later than that of the IRAP picture. Pictures of a third group III are pictures of which an output order and a decoding order are both later than those of the IRAP picture.

The pictures of the first group I may be output by being decoded irrespective of the IRAP picture.

The pictures which belong to the second group II and which are output earlier than the IRAP picture are called leading pictures. The leading pictures may be problematic in a decoding process when the IRAP picture is used as a random access point.

The pictures belonging to the third group III of which an output order and a decoding order are later than those of the IRAP picture are called normal pictures. The normal picture is not used as a reference picture of the leading picture.

A random access point in which random access occurs in the bitstream is an IRAP picture, and the random access starts when a first picture of the second group II is output.

Figure 7:
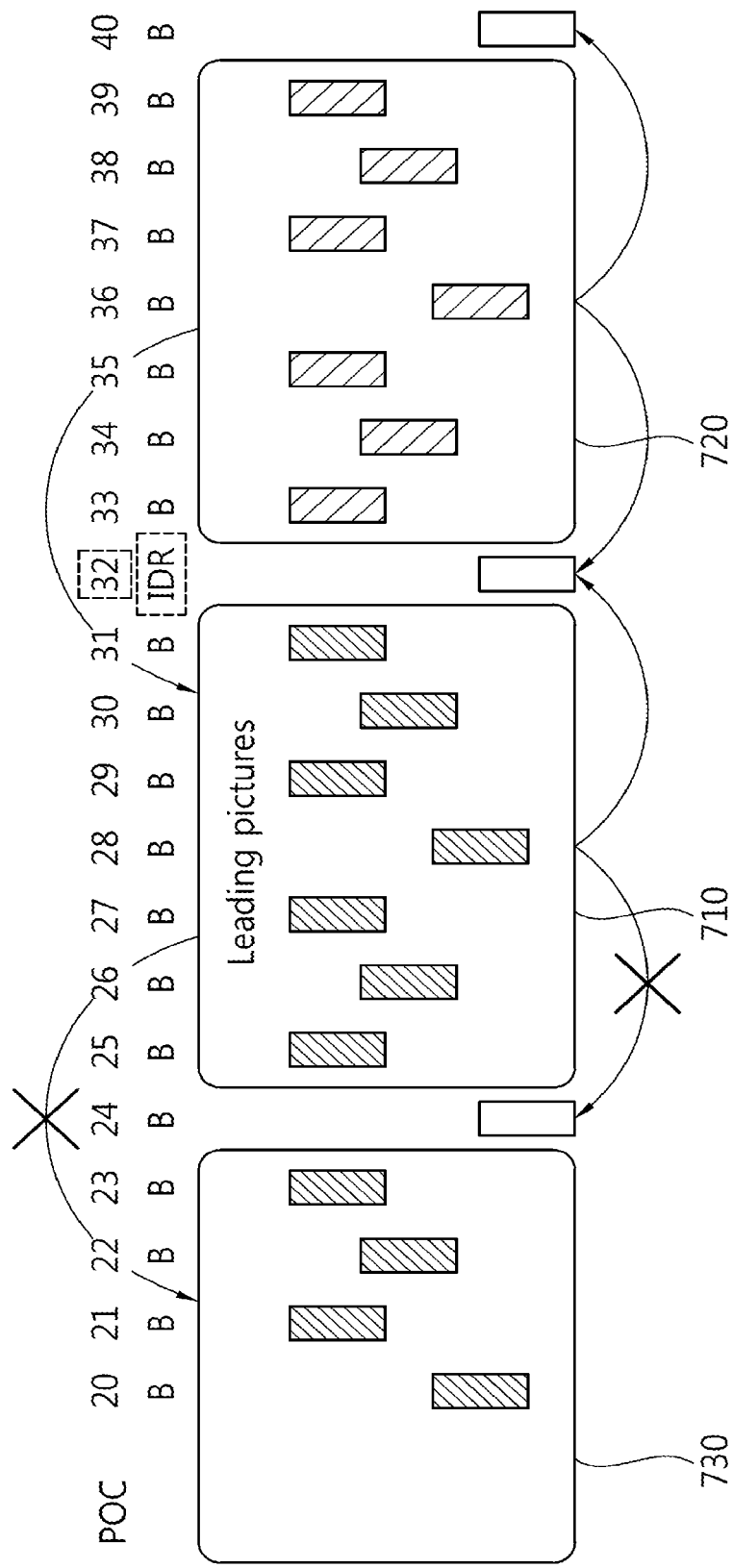
FIG. 7 is a diagram for explaining an instantaneous decoding refresh (IDR) picture.

FIG. 7 is a diagram for explaining an IDR picture.

The IDR picture is a picture used as a random access point when a group of picture has a closed structure. The IDR picture is an IRAP picture as described above, and thus includes only an I slice. The IDR picture may be a first picture in the bitstream in terms of a decoding order, and may appear in the middle of the bitstream. When the IDR picture is decoded, all reference pictures stored in a decoded picture buffer (DPB) are indicated by an "unused for reference".

A bar shown in FIG. 7 indicates a picture, and an arrow mark indicates a reference relation regarding whether the picture can use a different picture as a reference picture. A mark 'x' indicated on the arrow mark indicates that a picture indicated by the arrow mark cannot be referenced by a corresponding picture(s).

As shown, a picture of which a POC is 32 is an IDR picture. If the POC is 25 to 31, pictures which are output earlier than the IDR picture are leading pictures 710. Pictures of which a POC is greater than or equal to 33 correspond to a normal picture 720.

The leading pictures 710 of which an output order is earlier than that of the IDR picture can use the IDR picture and a different leading picture as a reference picture, but cannot use a previous picture 730 of which an output order and a decoding order are earlier than those of the leading pictures 710 as the reference picture.

The normal pictures 720 of which an output order and a decoding order are later than those of the IDR picture may be decoded by referring to the IDR picture, the leading picture, and a different normal picture.

Figure 8:
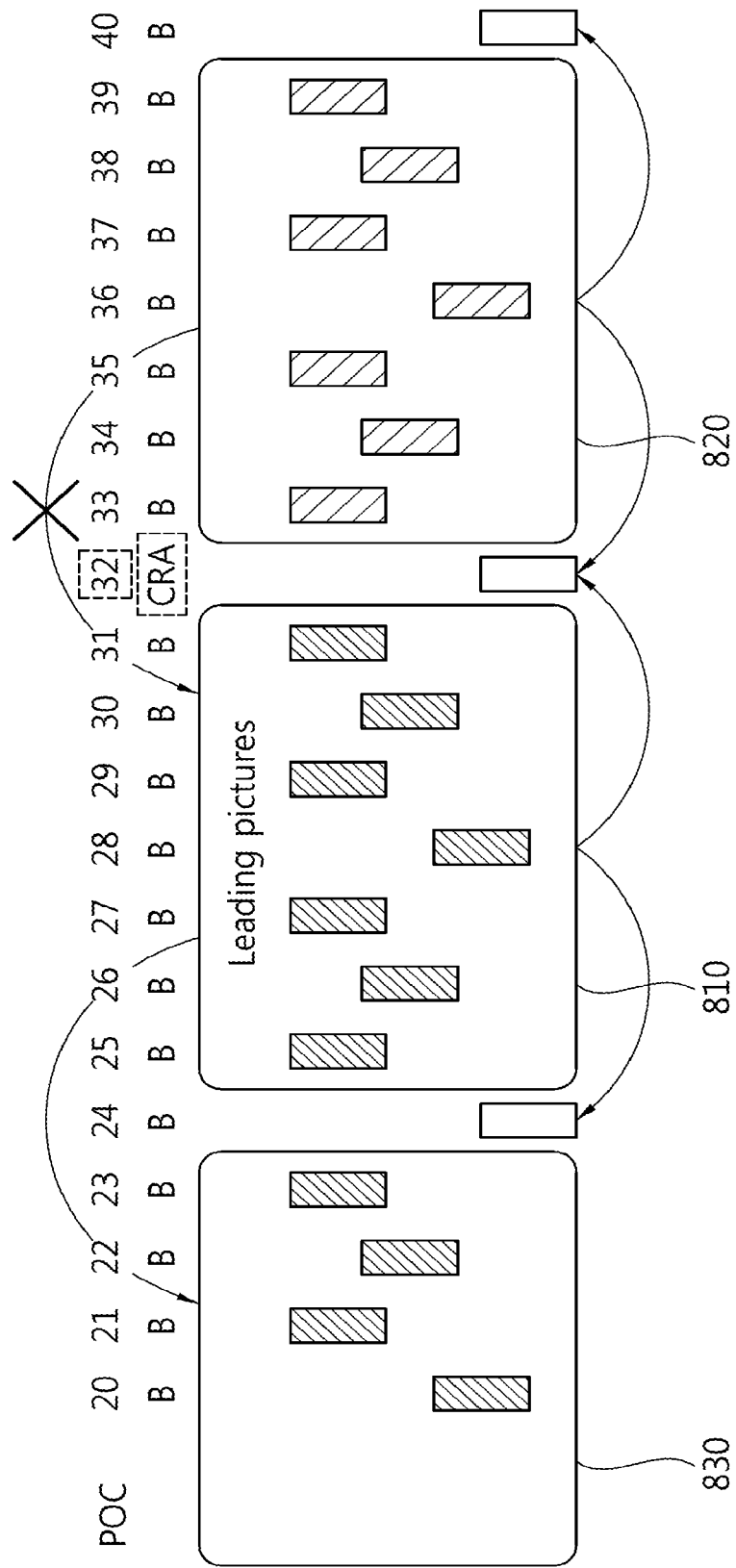
FIG. 8 is a diagram for explaining a clean random access (CRA) picture.

FIG. 8 is a diagram for explaining a CRA picture.

The CRA picture is a picture used as a random access point when a group of picture has an open structure. As described above, the CRA picture is also an IRAP picture and thus includes only an I slice. The IDR picture may be a first picture in the bitstream in terms of a decoding order, and may appear in the middle of the bitstream for a normal play.

A bar shown in FIG. 8 indicates a picture, and an arrow mark indicates a reference relation regarding whether the picture can use a different picture as a reference picture. A mark 'x' indicated on the arrow mark indicates that a picture indicated by the arrow mark cannot be referenced by a corresponding picture or pictures.

Leading pictures 810 of which an output order is earlier than that of the CRA picture can use all pictures, i.e., a CRA picture, a different leading picture, and previous pictures 830 of which an output order and a decoding order are earlier than those of the leading pictures 810 as a reference picture.

On the other hand, normal pictures 820 of which an output order and a decoding order are later than those of the CRA picture may be decoded by referring to the CRA picture and a different normal picture. The normal pictures 820 may not use the leading pictures 810 as the reference picture.

A BLA picture implies a picture which has a similar function and property as the CRA picture and which exists in the middle of a bitstream as a random access point when a coded picture is sliced or the bitstream is broken in the middle. However, since the BLA picture is regarded as a start of a new sequence at the occurrence of random access, unlike the CRA picture, parameter information regarding an image can be entirely received again when the BLA picture is received by a decoder.

The BLA picture may be determined from an encoding apparatus, and the CRA picture may be changed to the BLA picture in a system which receives the bitstream from the encoding apparatus. For example, when the bitstream is sliced, the system changes the CRA picture into the BLA picture and thus provides it to the decoder which decodes an image. In this case, parameter information regarding the image is also newly provided from the system to the decoder. In the present invention, the decoder implies a device including an image processor for decoding an image, and may be implemented with the decoding apparatus of FIG. 2, or may imply a decoding module which is a core module for processing the image.

As described above, the leading pictures are output earlier than the CRA picture according to the output order, but are decoded later than the CRA picture. At least one of previous pictures may be referenced by the leading pictures.

For example, when the bitstream is broken or lost in the middle or when random access occurs in the CRA picture abruptly at the occurrence of slicing of the picture, previous pictures of which a decoding order is earlier than that of the CRA picture may be unavailable. That is, since the previous pictures which may be used as a reference picture of the leading pictures are unavailable, the leading picture which refers to the unavailable picture may not be normally decoded.

A case where the reference picture referenced by the leading picture is unavailable implies a case where the leading picture refers to a picture not existing in the bitstream or a picture referenced by the leading picture does not exist in a decoded picture buffer (DPB) or is a picture marked by an "unused for reference" in the DPB.

As described above, since the leading picture which refers to the unavailable reference picture may not be normally decoded, such a leading picture may be discarded in a decoding process. Therefore, at the occurrence of the random access, information capable of distinguishing a decodable leading picture and an undecodable leading picture is required to a normal decoding process of the leading picture. Such information may be provided in an NAL unit type, and an embodiment of the NAL unit type for the leading picture is described below.

DLP_NUT: An NAL unit type (NUT) for an NAL unit including a coded slice segment of a decodable leading picture (DLP). The decodable leading picture implies a decodable leading picture for random access. All decodable leading pictures for random access are leading pictures. The decodable leading pictures for random access are not used as a reference picture in a decoding process of trailing pictures related to the same RAP (or IRAP) picture. In the presence of the decodable leading pictures for random access, the decodable leading pictures for random access have a decoding order earlier than that of the trailing pictures related to the same RAP (or IRAP) picture.

TFD_NUT: A type for an NAL unit including a coded slice segment of a tagged for discard (TFD) leading picture which may be discarded without being normally decoded when a picture which appears earlier than the RAP picture is unavailable. The TFD leading picture may be a skipped leading picture for random access. The skipped leading pictures for random access are leading pictures related to the BLA or CRA picture. The skipped leading picture for random access can refer to pictures not existing in the bitstream, and thus the skipped leading picture for random access are not output and cannot be correctly decoded. The skipped leading picture for random access are not used as reference pictures in a decoding process of pictures other than the skipped leading picture for random access. In the presence of the skipped leading pictures for random access, the skipped leading pictures for random access have a decoding order earlier than that of the trailing pictures related to the same RAP (or IRAP) picture.

The DLP and TFD leading picture may be processed in the same method as that of the trailing pictures in the normal decoding process performed when random access or splicing does not occur.

Figure 9:
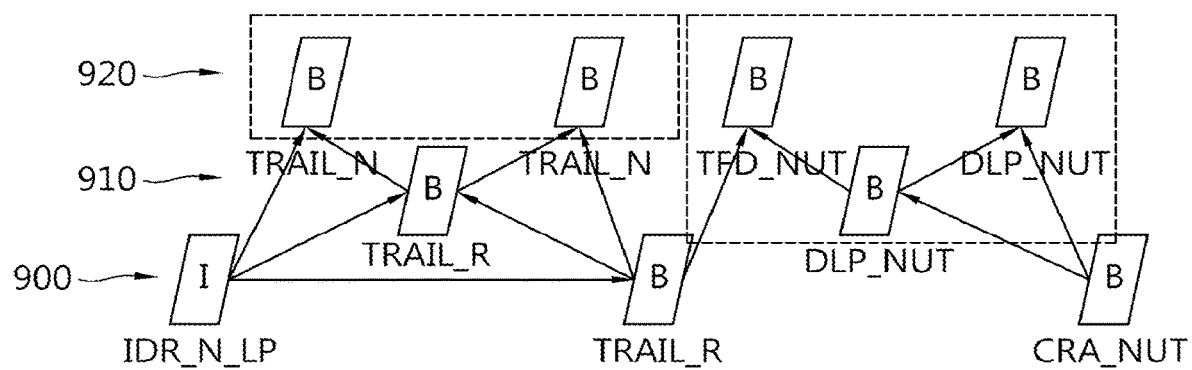
FIG. 9 shows a temporal layer structure for NAL units including a leading picture in a bitstream supporting a temporal scalability.

FIG. 9 shows a temporal layer structure for NAL units including a leading picture in a bitstream supporting a temporal scalability.

If the bitstream supports the temporal scalability, NAL units included in the bitstream have identification information (e.g., temporal_id) of the temporal layer.

For example, assuming a case where NAL units of which temporal_id is 0, 1, 2 are included in the bitstream, as shown in FIG. 9, it may be classified into a temporal layer 900 consisting of NAL units of which temporal_id is 0, a temporal layer 910 consisting of NAL units of which temporal_id is 1, and a temporal layer 920 consisting of NAL units of which temporal_id is 2. In this case, the temporal layer 900 consisting of NAL units of which temporal_id is 0 may provide a lowest temporal scalability, and the temporal layer 920 consisting of NAL units of which temporal_id is 2 may provide a highest temporal scalability.

In FIG. 9, a box indicated by I is an I picture, and a box indicated by B is a B picture. In addition, an arrow mark indicates a reference relation regarding whether one picture refers to another picture. For example, a TRAIL_R picture of the temporal layer 910 of which temporal-id is 1 uses a IDR_N_LP picture and a TRAIL_R picture of the temporal layer 900 of which temporal_id is 0 as a reference picture, and is used as a reference picture by TRAIL_N pictures of the temporal layer 920 of which temporal_id is 2.

In the example of FIG. 9, an NAL unit type can be used to know that TRAIL_N pictures of the temporal layer 920 of which temporal_id is 2 are pictures not referenced by different pictures. In this case, similarly to the embodiment of FIG. 5 described above, the TRAIL_N pictures not referenced when the bitstream is extracted may be removed from the bitstream. However, DLP_NUT and TFD_NUT leading pictures of the temporal layer 920 of which temporal_id is 2 do not include information capable of distinguishing whether the pictures are pictures referenced by different pictures. Therefore, it is difficult to determine whether it has an effect on a decoding process even if the leading picture is removed from the bitstream in the bitstream extraction process.

In order to solve the aforementioned problem, the present invention provides information indicating whether the leading picture is a picture referenced by a different picture. According to an embodiment of the present invention, an NAL unit type for the leading picture is defined as follows.

DLP__R: A referenced decodable leading picture. In other words, a type for an NAL unit including a coded slice segment of a random access decodable leading (RADL) referenced by a different picture.

DLP__N: A non-referenced decodable leading picture. In other words, a type for an NAL unit including a coded slice segment of a random access decodable leading (RADL) picture not referenced by a different picture.

TFD__R: A referenced undecodable picture (i.e., a referenced TFD picture). In other words, a type for an NAL unit including a coded slice segment of a leading picture which may not be normally decoded when a picture which appears earlier than the RAP picture is unavailable and which is referenced by a different picture. The TFD leading picture is a picture which may be discarded (or skipped), and may be called a random access skipped leading (RASL) picture.

TFD_N: A non-referenced undecodable picture (i.e., non-referenced TFD picture). In other words, a type for an NAL unit including a coded slice segment of a leading picture which may not be normally decoded when a picture which appears earlier than the RAP picture is unavailable and which is not referenced by a different picture. The TFD leading picture is a picture which may be discarded (or skipped), and may be called a random access skipped leading (RASL) picture.

The aforementioned NAL unit types DLP_R, DLP_N, TFD_R, TFD_N for the leading picture according to the embodiment of the present invention may be defined by using reserved NAL unit types which are not yet used by a different type. In addition, the NAL unit types DLP_R, DLP_N, TFD_R, TFD_N for the leading picture according to the embodiment of the present invention may be signaled by being stored in syntax information (e.g., nal_unit_type) for the NAL unit type of an NAL unit header.

The followings are examples applicable to NAL unit types DLP_R, DLP_N, TFD_R, TFD_N for a leading picture according to an embodiment of the present invention.

When the NAL unit type (e.g., nal_unit_type) is TFD_N or DLP_N, a picture to be decoded is not included in a reference picture set (RPS) of a picture having identification information (e.g., temporal_id) of the same temporal layer.

The RPS implies a set of reference pictures of a current picture, and may consist of reference pictures of which a decoding order is earlier than that of the current picture. The reference picture may be used in an inter prediction of the current picture. Herein, the RPS may be a short term reference picture set (e.g., RefPicSetStCurrBefore, RefPicSetStCurrAfter) and a long term reference picture set (e.g., RefPicSetLtCurr) which consist of reference pictures of which a picture order count (POC) order is earlier than or later than that of the current picture.

A coded picture of which an NAL unit type (e.g., nal_unit_ type) is TFD_N or DLP_N may be discarded without having an effect on a decoding process of different pictures having identification information (e.g., temporal_id) of the same temporal layer. This is because whether the coded picture with TFD_N or DLP_N is a picture referenced by different pictures can be known by using the NAL unit type, and can be extracted from a bitstream since it is not used as a reference picture in decoding.

A coded picture of which an NAL unit type (e.g., nal_unit_ type) is TFD_N or DLP_N may be processed similarly to the aforementioned TRAIL_N, TSA_N, or STSA_N picture if not a case where decoding starts from a random access point related to a leading picture.

A coded picture of which an NAL unit type (e.g., nal_unit_ type) is TFD_R or DLP__R may be processed similarly to the aforementioned TRAIL_R, TSA_R, or STSA_R picture if not a case where decoding starts from a random access point related to a leading picture.

Figure 10:
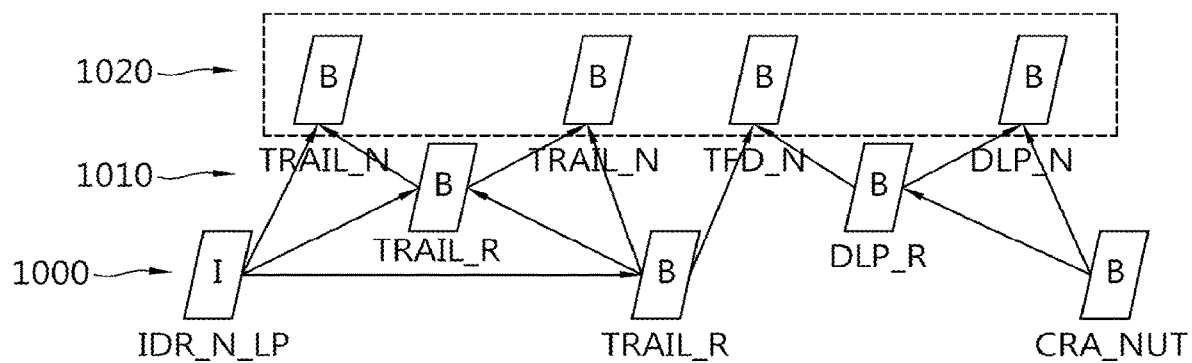
FIG. 10 is a diagram for explaining an operation of removing NAL units including a leading picture from a bitstream according to an embodiment of the present invention.

FIG. 10 is a diagram for explaining an operation of removing NAL units including a leading picture from a bitstream according to an embodiment of the present invention.

If the bitstream supports the temporal scalability, NAL units included in the bitstream have identification information (e.g., temporal_id) of the temporal layer.

For example, assuming a case where NAL units of which temporal_id is 0, 1, 2 are included in the bitstream, as shown in FIG. 10, it may be classified into a temporal layer 1000 consisting of NAL units of which temporal_id is 0, a temporal layer 1010 consisting of NAL units of which temporal_id is 1, and a temporal layer 1020 consisting of NAL units of which temporal_id is 2. In this case, the temporal layer 1000 consisting of NAL units of which temporal_id is 0 may provide a lowest temporal scalability, and the temporal layer 1020 consisting of NAL units of which temporal_id is 2 may provide a highest temporal scalability.

In FIG. 10, a box indicated by I is an I picture, and a box indicated by B is a B picture. In addition, an arrow mark indicates a reference relation regarding whether one picture refers to another picture.

As shown in FIG. 10, the temporal layer 1020 of which temporal_id is 2 consists of TRAIL_N pictures and TFD_N and DLP_N leading pictures. As described above, since the TRAIL_N picture is a trailing picture not referenced by a different picture, it can be removed from a bitstream without having an effect on a decoding process of different pictures.

In addition, since the leading picture is signaled by being defined with an NAL unit type indicating whether it is a picture referenced by a different picture according to the embodiment of the present invention, whether the leading picture can be removed from the bitstream can be known by using the NAL unit type. As shown in FIG. 10, the TFD_N and DLP_N leading pictures are leading pictures not referenced by a different picture, and can be removed from the bitstream without having an effect on a decoding process of the different pictures. That is, since information regarding whether the leading picture is a reference picture or a non-reference picture can be derived from the NAL unit type, a bitstream extraction process for the leading picture may be performed similarly to a bitstream extraction process of a trailing picture. Therefore, since pictures corresponding to the temporal layer 1020 of which temporal_id is 2 are non-reference pictures, the non-reference pictures of the temporal layer 1020 of which temporal_id is 2 may be extracted from the bitstream in decoding.

Figure 11:
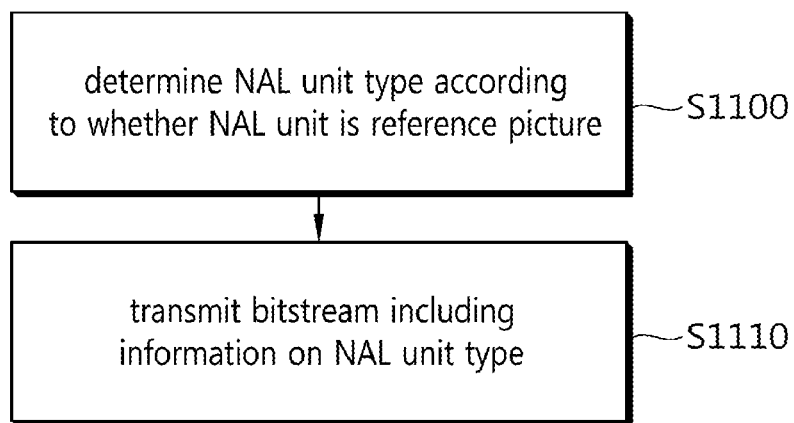
FIG. 11 is a flowchart showing an encoding method of image information according to an embodiment of the present invention.

FIG. 11 is a flowchart showing an encoding method of image information according to an embodiment of the present invention. The method of FIG. 11 may be performed in the aforementioned encoding apparatus of FIG. 1.

Referring to FIG. 11, the encoding apparatus determines an NAL unit type according to whether an NAL unit is a reference picture (step S1100). In this case, the NAL unit may be an NAL unit including a residual signal for a current picture generated by performing an inter prediction on the basis of the current picture.

The encoding apparatus may determine the NAL unit type according to information (i.e., the residual signal for the current picture) included in the NAL unit. For example, the NAL unit type may be determined according to whether the NAL unit is a leading picture referenced by a different picture or a leading picture not referenced by the different picture. The leading picture implies a picture of which an output order is earlier than that of a random access point picture and an decoding order is later than that, and may include a first leading picture which can be decoded and a second leading picture which cannot be decoded.

If the NAL unit is a first leading picture referenced by a different picture, the encoding apparatus may determine the NAL unit type to DLP_R or RADL_R. If the NAL unit is a first leading picture not referenced by the different picture, the encoding apparatus may determine the NAL unit to DLP_N or RADL_N.

Otherwise, if the NAL unit is a second leading picture referenced by the different picture, the encoding apparatus may determine the NAL unit type to TFD_R or RASL_R, and if the NAL unit is a second leading picture not referenced by the different picture, the encoding apparatus may determine the NAL unit type to TFD_N or RASL_N.

The encoding apparatus encodes and transmits a bitstream including information on the NAL unit and the NAL unit type (step S1110).

The encoding apparatus may encode the information on the NAL unit type by using a nal_unit_type syntax and may store it in an NAL unit header. In addition, in case of a bitstream supporting a temporal scalability, the encoding apparatus may generate a bitstream further including identification information of a temporal layer for identifying a temporal scalable layer of an NAL unit. The identification information of the temporal layer may be encoded with the temporal_id syntax and may be stored in the NAL unit header.

Figure 12:
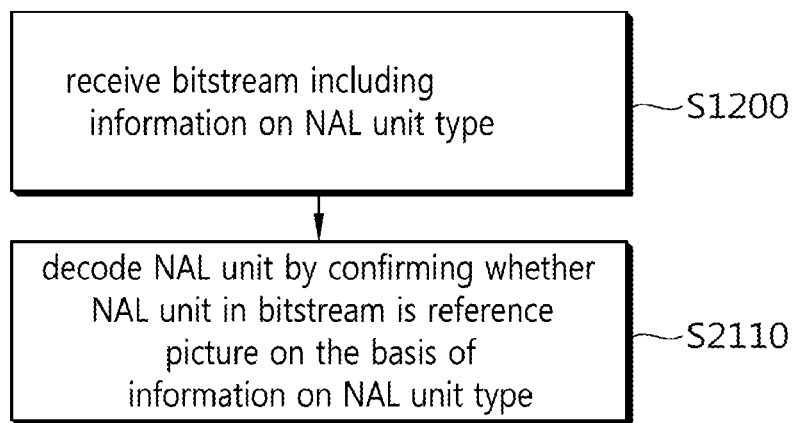
FIG. 12 is a flowchart showing a decoding method of image information according to an embodiment of the present invention.

FIG. 12 is a flowchart showing a decoding method of image information according to an embodiment of the present invention. The method of FIG. 12 may be performed in the aforementioned decoding apparatus of FIG. 2.

Referring to FIG. 12, the decoding apparatus receives a bitstream including information on an NAL unit (step S1200).

The information on the NAL unit includes information on an NAL unit type determined by a property and type of a picture included in the NAL unit. As to the NAL unit type, in addition to a property and type of the picture included in the NAL unit, information regarding whether the picture included in the NAL unit is a reference picture may also be derived together.

For example, the information on the NAL unit type may be included in the bitstream and thus be stored in an NAL unit header by using nal_unit_type syntax. Since the NAL unit type has been described above in detail, an explanation thereof will be omitted herein.

In addition, the information on the NAL unit may further include identification information of a temporal layer supporting a temporal scalability. The identification information of the temporal layer may be layer identification information for identifying a temporal scalable layer of a corresponding NAL unit. For example, the identification information of the temporal layer may be included in the bitstream and thus be stored in an NAL unit header by using the temporal_id syntax.

The decoding apparatus decodes the NAL unit by confirming whether the NAL unit in the bitstream is a reference picture on the basis of the information on the NAL unit type (step S1210).

The information on the NAL unit type may be used to derive whether the NAL unit is a reference picture referenced by a different picture or a non-reference picture not referenced by the different picture. If the NAL unit is the non-reference picture not referenced by the different picture, the NAL unit may be removed by extracting from the bitstream in a decoding process.

For example, the information on the NAL unit type may be information indicating whether the NAL unit is a leading picture referenced by the different picture or whether the NAL unit is a leading picture not referenced by the different picture. The leading picture implies a picture of which an output order is earlier than that of a random access point picture and an decoding order is later than that, and may include a first leading picture which can be decoded and a second leading picture which cannot be decoded.

If the NAL unit type included in the bitstream is DLP_R or RADL_R, the decoding apparatus may know that the NAL unit is a first leading picture referenced by the different picture. If the NAL unit type included in the bitstream is DLP_N or RADL_N, the decoding apparatus may know that the NAL unit is a first leading picture not referenced by the different picture.

Otherwise, if the NAL unit type included in the bitstream is TFD_R or RASL_R, the decoding apparatus may know that the NAL unit is a second leading picture referenced by the different picture. If the NAL unit type included in the bitstream is TFD_N or RASL_N, the decoding apparatus may know that the NAL unit is a second leading picture not referenced by the different picture.

In this case, if the NAL unit type is DLP_N or RADL_N, TFD_N or RASL_N, the decoding apparatus may extract the NAL unit corresponding to the NAL unit type from the bitstream and then may perform decoding.

In addition, the decoding apparatus may derive a temporal layer of the NAL unit by using identification information of the temporal layer. If NAL units of the same temporal layer are pictures (e.g., DLP_N or RADL_N picture, TFD_N or RASL_N picture) not referenced by a different picture, the NAL units of the temporal layer may be removed from the bitstream. Herein, the NAL units of the same temporal layer imply NAL units having the same identification value of the temporal layer.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. The aforementioned embodiments include various exemplary aspects. Therefore, all replacements, modifications and changes should fall within the spirit and scope of the claims of the present invention.

The invention claimed is:

1. A video decoding method performed by a decoding apparatus, the method comprising:
  receiving a bitstream;
  obtaining residual information from the bitstream;
  obtaining network abstraction layer (NAL) unit type information and temporal identifier (ID) information from the bitstream;
  determining a NAL unit type of a leading picture as one of NAL unit types, based on the NAL unit type information, wherein the leading picture precedes an associated random access point picture in output order;
  deriving a temporal ID of the leading picture based on the temporal ID information;
  configuring a reference picture set, including RefPicSetStCurrBefore, RefPicSetStCurrAfter and RefPicSetLtCurr, for inter prediction with regard to a picture which follows the leading picture in decoding order, based on the NAL unit type and the temporal ID of the leading picture;
  deriving prediction samples by performing the inter prediction on a current block in the picture based on the reference picture set;
  deriving residual samples of the current block based on the residual information; and
  reconstructing the picture based on the prediction samples and the residual samples,
  wherein the NAL unit types includes a first NAL unit type representing referenced decodable leading picture, a second NAL unit type representing non-referenced decodable leading picture, a third NAL unit type representing referenced skipped leading picture, and a fourth NAL unit type representing non-referenced skipped leading picture,
  wherein the leading picture with the second NAL unit type or the leading picture with the fourth NAL unit type is not included in any of the RefPicSetStCurrBefore, the RefPicSetStCurrAfter and the RefPicSetLtCurr of the picture with a same value of the temporal ID.

2. The method of claim 1, wherein based on the NAL unit type of the leading picture being the second NAL unit type or the fourth NAL unit type, the leading picture cannot be used for inter prediction of subsequent pictures of the same temporal layer in the decoding order.

3. The method of claim 1, wherein in the configuring of the reference picture set, the leading picture of which NAL unit type is the first NAL unit type or the third NAL unit type is included in the reference picture set, and
  wherein the leading picture is a picture which follows the random access point picture in the decoding order and precedes the random access point picture in the output order.

4. The method of claim 1, wherein based on the NAL unit type of the leading being the second NAL unit type or the fourth NAL unit type, the leading picture can be used for inter prediction of subsequent pictures of higher temporal layers.

5. The method of claim 1, wherein the random access point picture in which random access occurs is an instantaneous decoding refresh (IDR) picture, and
  wherein the NAL unit type of the leading picture is the first NAL unit type or the second NAL unit type.

6. The method of claim 1, wherein the random access point picture in which random access occurs is a clean random access (CRA) picture or a broken link access (BLA) picture, and
  wherein based on the NAL unit type of the leading picture being the second NAL unit type or the fourth NAL unit type, the leading picture is not output.

7. The method of claim 1, wherein the random access point picture in which random access occurs is an instantaneous decoding refresh (IDR) picture, a clean random access (CRA) picture, or a broken link access (BLA) picture, and
  wherein each picture stored in a memory is marked as a non-referenced picture.

8. The method of claim 1, wherein when random access occurs in the random access point picture and the NAL unit type of the leading picture is the second NAL unit type or the fourth NAL unit type, the leading picture is removable without having an effect on the decoding of other pictures of the same temporal layer.

9. A video encoding method performed by an encoding apparatus, the method comprising:
  determining a NAL unit type of a leading picture as one of NAL unit types, wherein the leading picture precedes an associated random access point picture in output order;
  generating NAL unit type information based on the determined NAL unit type;
  deriving a temporal identifier (ID) of the leading picture;
  generating temporal ID information based on the derived temporal ID;
  configuring a reference picture set, including RefPicSetStCurrBefore, RefPicSetStCurrAfter and RefPicSetLtCurr, for inter prediction with regard to a picture which follows the leading picture in decoding order, based on the NAL unit type and the temporal ID of the leading picture;
  deriving prediction samples by performing the inter prediction on a current block in the picture based on the reference picture set;
  generating residual information based on the prediction samples; and
  encoding image information including the NAL unit type information, the temporal ID information and the residual information, to generate a bitstream,
  wherein the NAL unit types includes a first NAL unit type representing referenced decodable leading picture, a second NAL unit type representing non-referenced decodable leading picture, a third NAL unit type representing referenced skipped leading picture, and a fourth NAL unit type representing non-referenced skipped leading picture,
  wherein the leading picture with the second NAL unit type or the leading picture with the fourth NAL unit type is not included in any of the RefPicSetStCurrBefore, the RefPicSetStCurrAfter and the RefPicSetLtCurr of the picture with a same value of the temporal ID.

10. The method of claim 9, wherein based on the NAL unit type of the leading picture being the second NAL unit type or the fourth NAL unit type, the leading picture cannot be used for inter prediction of subsequent pictures of the same temporal layer in the decoding order.

11. The method of claim 9, wherein in the configuring of the reference picture set, the leading picture of which NAL unit type is the first NAL unit type or the third NAL unit type is included in the reference picture set, and wherein the leading picture is a picture which follows the random access point picture in the decoding order and precedes the random access point picture in the output order.

12. The method of claim 9, wherein based on the NAL unit type of the leading being the second NAL unit type or the fourth NAL unit type, the leading picture can be used for inter prediction of subsequent pictures of higher temporal layers.

13. The method of claim 9, wherein the random access point picture in which random access occurs is an instantaneous decoding refresh (IDR) picture, and wherein the NAL unit type of the leading picture is the first NAL unit type or the second NAL unit type.

14. The method of claim 9, wherein the random access point picture in which random access occurs is a clean random access (CRA) picture or a broken link access (BLA) picture, and wherein based on the NAL unit type of the leading picture being the second NAL unit type or the fourth NAL unit type, the leading picture is not output.

15. The method of claim 9, wherein the random access point picture in which random access occurs is an instantaneous decoding refresh (IDR) picture, a clean random access (CRA) picture, or a broken link access (BLA) picture, and wherein each picture stored in a memory is marked as a non-referenced picture.

16. The method of claim 9, wherein when random access occurs in the random access point picture and the NAL unit type of the leading picture is the second NAL unit type or the fourth NAL unit type, the leading picture is removable without having an effect on the decoding of other pictures of the same temporal layer.

17. A transmission method of data for an image, the transmission method comprising:

obtaining a bitstream generated by performing determining a NAL unit type of a leading picture as one of NAL unit types, wherein the leading picture precedes an associated random access point picture in output order, generating NAL unit type information based on the determined NAL unit type, deriving a temporal identifier (ID) of the leading picture, generating temporal ID information based on the derived temporal ID, configuring a reference picture set, including RefPicSetStCurrBefore, RefPicSetStCurrAfter and RefPicSetLtCurr, for inter prediction with regard to a picture which follows the leading picture in decoding order, based on the NAL unit type and the temporal ID of the leading picture, deriving prediction samples by performing the inter prediction on a current block in the picture based on the reference picture set, generating residual information based on the prediction samples and encoding image information including the NAL unit type information, the temporal ID information and the residual information, to generate the bitstream; and transmitting the data comprising the bitstream, wherein the NAL unit types includes a first NAL unit type representing referenced decodable leading picture, a second NAL unit type representing non-referenced decodable leading picture, a third NAL unit type representing referenced skipped leading picture, and a fourth NAL unit type representing non-referenced skipped leading picture, wherein the leading picture with the second NAL unit type or the leading picture with the fourth NAL unit type is not included in any of the RefPicSetStCurrBefore, the RefPicSetStCurrAfter and the RefPicSetLtCurr of the picture with a same value of the temporal ID.

* * * * *